United States Patent
Ogura et al.

(10) Patent No.: US 12,319,166 B2
(45) Date of Patent: Jun. 3, 2025

(54) VEHICLE MANAGEMENT DEVICE

(71) Applicant: TOYOTA JIDOSHA KABUSHIKI KAISHA, Toyota (JP)

(72) Inventors: Hiroyuki Ogura, Ama (JP); Hideo Sakamoto, Toyota (JP); Yoshinobu Nozaki, Anjo (JP); Hisashi Fujisawa, Toyota (JP); Shoichi Iwamoto, Fuji (JP); Mitsuaki Tomita, Toyota (JP); Yasunobu Seki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 18/526,087

(22) Filed: Dec. 1, 2023

(65) Prior Publication Data
US 2024/0278669 A1    Aug. 22, 2024

(30) Foreign Application Priority Data
Feb. 21, 2023  (JP) .................................. 2023-024832

(51) Int. Cl.
*B60L 53/51* (2019.01)
*B60L 50/60* (2019.01)
*H02J 3/38* (2006.01)
*H02J 7/35* (2006.01)
*H02S 10/20* (2014.01)
*H02S 10/40* (2014.01)
*H02S 50/00* (2014.01)

(52) U.S. Cl.
CPC ............... *B60L 53/51* (2019.02); *B60L 50/60* (2019.02); *H02J 3/38* (2013.01); *H02J 7/35* (2013.01); *H02S 10/20* (2014.12); *H02S 10/40* (2014.12); *H02S 50/00* (2013.01); *H02J 2300/24* (2020.01)

(58) Field of Classification Search
CPC .......... B60L 53/51; B60L 50/60; H02S 10/20; H02S 10/40; H02S 50/00; H02J 3/38; H02J 7/35; H02J 2300/24
See application file for complete search history.

(56) References Cited

FOREIGN PATENT DOCUMENTS

JP         2019-208350 A      12/2019

*Primary Examiner* — Robert L Deberadinis
(74) *Attorney, Agent, or Firm* — SoraIP, Inc.

(57) ABSTRACT

A vehicle equipped with a driving unit for traveling, a power storage device capable of supplying power to the drive unit, and a solar cell system capable of supplying power generated by a solar cell to the power storage device. A vehicle management device that determines the cause, based on whether or not a decrease in the amount of power generation has occurred while the vehicle is running and whether or not a decrease in the amount of power generation has occurred while the vehicle is parked, determines whether the decrease in the amount of power generation is caused by the state abnormality of the solar cell or the external environment.

5 Claims, 5 Drawing Sheets

VEHICLE MANAGEMENT DEVICE

CROSS-REFERENCE TO RELATED APPLICATION

This application claims priority to Japanese Patent Application No. 2023-024832 filed on Feb. 21, 2023, incorporated herein by reference in its entirety.

BACKGROUND

1. Technical Field

The present disclosure relates to a vehicle management device.

2. Description of Related Art

Conventionally, as this type of technology, a diagnostic device for diagnosing the cause of a decrease in the power generation amount in a solar power generation facility has been proposed (see, for example, Japanese Unexamined Patent Application Publication No. 2019-208350 (JP 2019-208350 A)). In this diagnostic device, based on a plurality of time-dependent data that associates the output power value or the output current value in the solar power generation facility with the measurement time that is information on the date and time, and a predetermined coefficient, the cause of the decrease in the power generation amount in the solar power generation facility is estimated.

SUMMARY

When a solar cell is mounted on a vehicle, the position of the solar cell also moves along with the movement of the vehicle. Based on this, an issue is how to determine whether the decrease in the power generation amount of the solar cell is caused by an abnormality in the state of the solar cell such as contamination of the solar cell, or an external environment such as the position of a parking lot in a shade, when a decrease in the power generation amount of the solar cell occurs.

A main object of a vehicle management device according to the present disclosure is to be able to determine the cause of the decrease in the power generation amount of the solar cell mounted on the vehicle.

The vehicle management device according to the present disclosure employs the following means to achieve the above-described main object.

The gist of a vehicle management device according to the present disclosure is as follows.

The vehicle management device is used in a vehicle that includes a driving unit for traveling, a power storage device that is able to supply power to the driving unit, and a solar cell system that is able to supply power generated by a solar cell to the power storage device, and determines cause of a decrease in a power generation amount of the solar cell; and the vehicle management device determines whether the decrease in the power generation amount is caused by an abnormality in a state of the solar cell or is caused by an external environment, based on whether the decrease in the power generation amount occurs while the vehicle travels and whether the decrease in the power generation amount occurs while the vehicle is parked.

The vehicle management device according to the present disclosure determines whether the decrease in the power generation amount is caused by the abnormality in the state of the solar cell or is caused by the external environment, based on whether the decrease in the power generation amount occurs while the vehicle travels and whether the decrease in the power generation amount occurs while the vehicle is parked. This makes it possible to determine the cause of the decrease in the power generation amount of the solar cell.

In the vehicle management device according to the present disclosure,
- the vehicle management device may determine that the decrease in the power generation amount is caused by the abnormality in the state, when determination is made that the decrease in the power generation amount occurs while the vehicle travels; and
- the vehicle management device may determine that the decrease in the power generation amount is caused by the external environment, when determination is made that the decrease in the power generation amount occurs while the vehicle is parked and that the decrease in the power generation amount does not occur while the vehicle travels.

This makes it possible to more appropriately determine whether the decrease in the power generation amount of the solar cell is caused by the abnormality in the state of the solar cell or is caused by the external environment.

In the vehicle management device according to the present disclosure,
- the vehicle management device may determine, while the vehicle travels, whether the decrease in the power generation amount occurs by comparing a power generation amount during traveling, the power generation amount being a power generation amount of the solar cell while the vehicle travels, with a first predetermined power generation amount; and
- the vehicle management device may determine, while the vehicle is parked, whether the decrease in the power generation amount occurs by comparing a power generation amount during parking, the power generation amount being a power generation amount of the solar cell while the vehicle is parked, with a second predetermined power generation amount, or comparing the power generation amount during parking with a power generation amount of the solar cell around the vehicle.

This makes it possible to more appropriately determine whether the decrease in the power generation amount of the solar cell occurs while the vehicle travels or is parked.

In the vehicle management device according to the present disclosure,
- the vehicle management device may determine, while the vehicle travels, whether the decrease in the power generation amount occurs using the power generation amount during traveling when a sunshine condition is satisfied; and
- the vehicle management device may determine, while the vehicle is parked, whether the decrease in the power generation amount occurs using the power generation amount during parking when the sunshine condition is satisfied.

In the vehicle management device according to the present disclosure,
- the vehicle management device may notify predetermine information when determination is made that the decrease in the power generation amount is caused by the abnormality in the state.

This makes it possible to inform a user that the decrease in the power generation amount of the solar cell is caused by the abnormality in the state of the solar cell.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
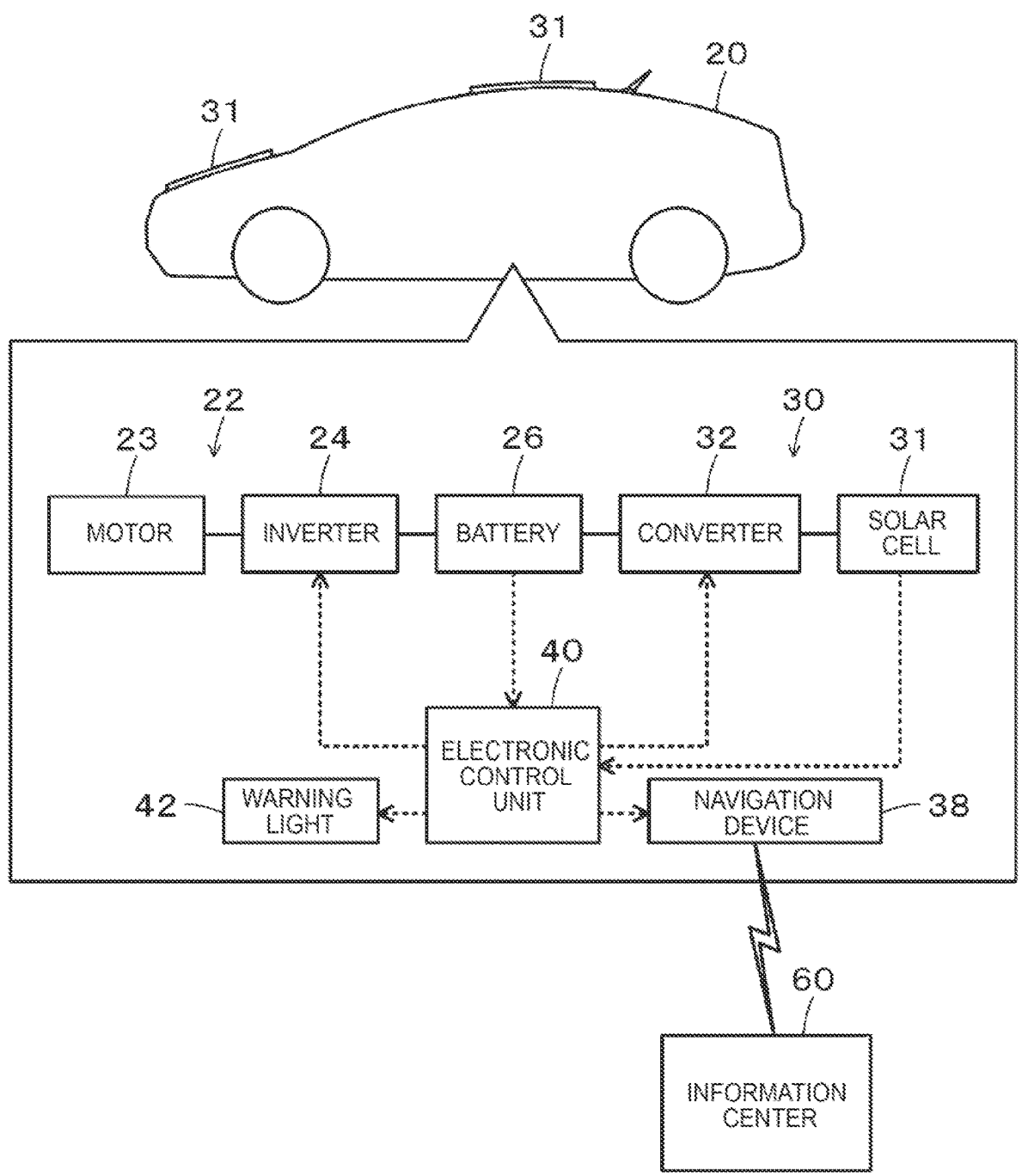
FIG. 1 is a schematic configuration diagram of a vehicle 20 equipped with a vehicle management device according to this embodiment.

Embodiments of the present disclosure will be described with reference to the drawings. FIG. 1 is a schematic configuration diagram of a vehicle 20 equipped with a vehicle management device according to this embodiment. As illustrated, the vehicle 20 is configured as a battery electric vehicle, and includes a driving unit 22, a battery 26 as a power storage device, a solar cell system 30, a navigation device 38 and an electronic control unit 40. The electronic control unit 40 corresponds to the vehicle management device of this embodiment.

The driving unit 22 has a motor 23 and an inverter 24. The motor 23 is configured as a synchronous generator-motor, and can output power for running. The inverter 24 is used to drive the motor 23 and is connected to the battery 26 via the power line. The battery 26 has a plurality of secondary battery cells configured as lithium-ion secondary batteries or nickel-hydrogen secondary batteries.

Solar cell system 30 has a solar cell 31 and a converter 32. The solar cell 31 has a plurality of solar cells and is fixed to the upper surface of the roof of the vehicle body, the upper surface of the hood, or the like. The converter 32 supplies the power generated by the solar cell 31 to the battery 26 with voltage conversion.

When the destination is set, the navigation device 38 sets the travel route from the current location to the destination based on the map information and the current location of the vehicle 20 and the destination detected by the GPS, and displays it on the display, route guidance. Navigation device 38 is in communication with electronic control unit 40. The navigation device 38 communicates with an information center 60 outside the vehicle 20, transmits the current location of the vehicle 20 to the information center 60, and also provides sunshine information (weather, sunrise and sunset time, etc.) of the current location of the vehicle 20 from the information center 60.

The electronic control unit 40 has a microcomputer, and the microcomputer has a CPU, ROM, RAM, flash memory, input/output ports, and communication ports. The electronic control unit 40 receives signals from various sensors through input ports. The signals input by the electronic control unit 40 include, for example, the voltage Vb and current Ib of the battery 26, the voltage Vs1 and current Is1 on the solar cell 31 side of the converter 32, the voltage Vs2 and current Is2 on the battery 26 side of the converter 32, and the like can be mentioned. The electronic control unit 40 outputs various control signals through an output port. Examples of the signal output by the electronic control unit 40 include a control signal to the driving unit 22, a control signal to the converter 32, a control signal to the warning light 42, and the like. The electronic control unit 40 calculates the power storage ratio SOC of the battery 26 based on the integrated value of the current Ib of the battery 26, and the power generation of the solar cell 31 based on the voltage Vs1 and the current Is1 on the solar cell 31 side of the converter 32. It also calculates the power generation Ps. Electronic control unit 40 is in communication with navigation device 38 as described above.

Figure 2:
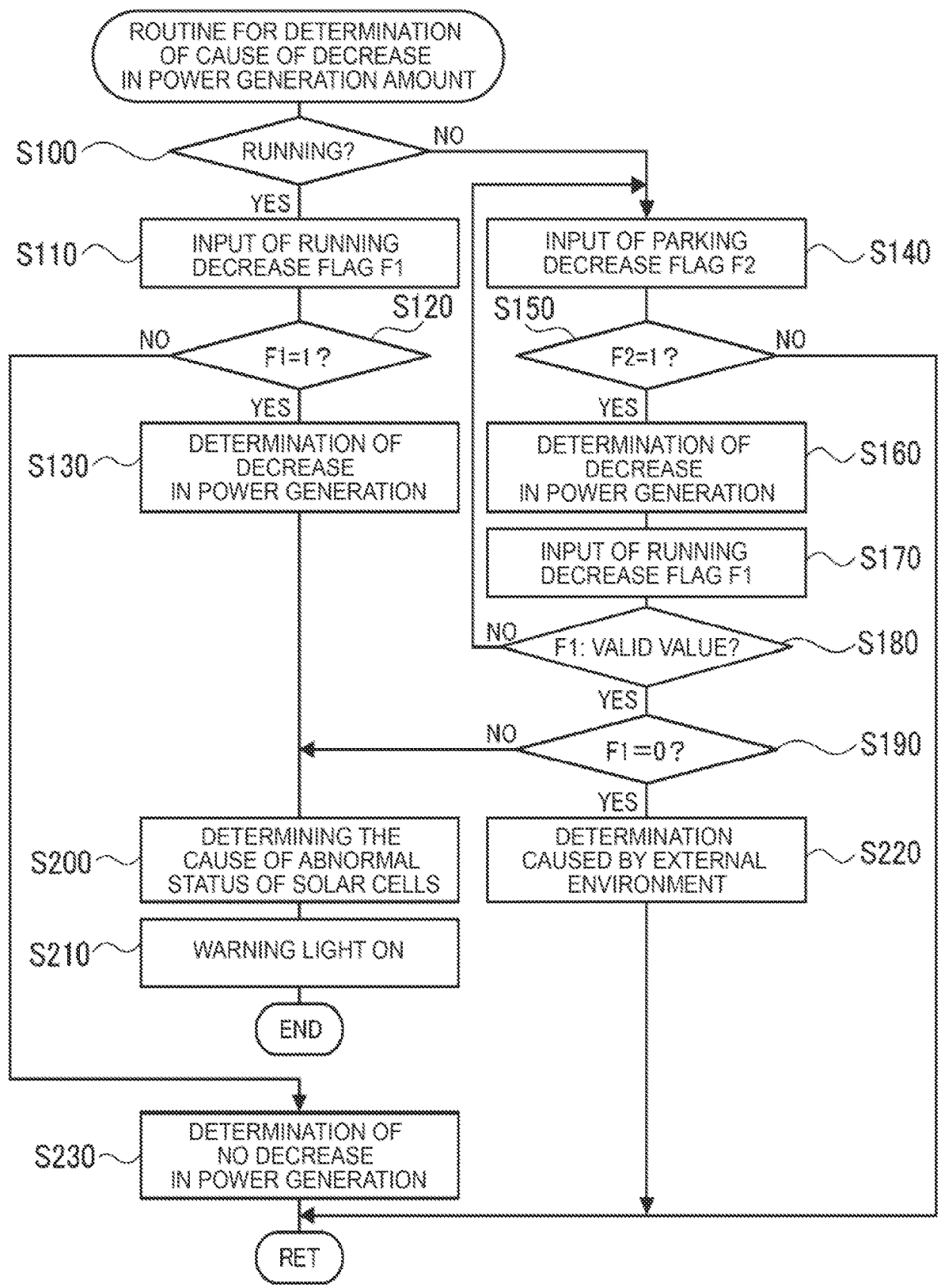
FIG. 2 is a flowchart showing an example of a routine for determining the cause of a decrease in power generation.
Figure 3:
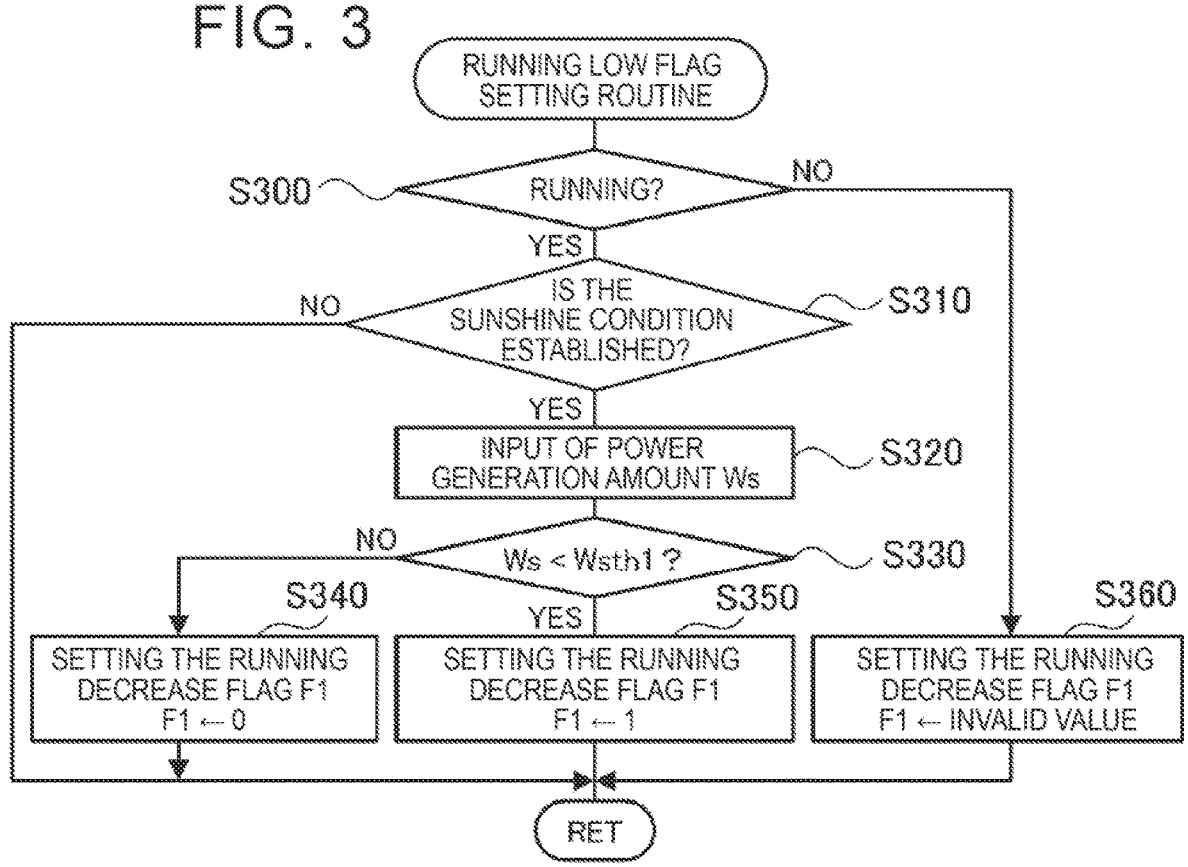
FIG. 3 is a flowchart showing an example of a running drop flag setting routine.
Figure 4:
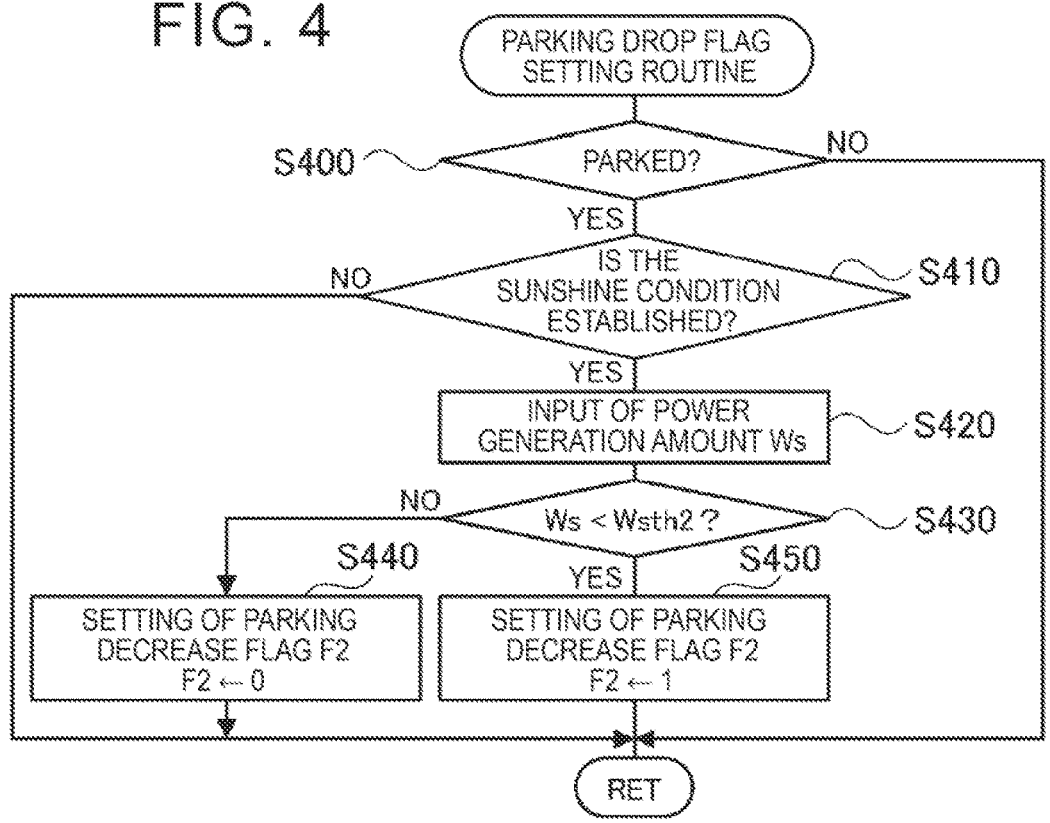
FIG. 4 is a flowchart showing an example of a parking drop flag setting routine.

Next, the operation of the electronic control unit 40 mounted on the vehicle 20 of the present embodiment, in particular, the process of determining the cause when the power generation amount of the solar cell 31 is reduced will be described. FIG. 2 is a flowchart showing an example of a routine for determining the cause of a drop in the amount of power generated, FIG. 3 is a flowchart showing an example of a running drop flag setting routine, and FIG. 4 is a flowchart showing an example of a parking drop flag setting routine. The running decrease flag F1 set by the running low flag setting routine of FIG. 3 and the parking decrease flag F2 set by the parking low flag setting routine of FIG. 4 are used in the power generation amount lowering cause determination routine in FIG. 2. Hereinafter, the running low flag setting routine of FIG. 3, the low flag setting routine during parking in FIG. 4, and the power generation amount low cause determining routine in FIG. 2 will be described in this order.

First, the running decrease flag setting routine of FIG. 3 will be described. This routine is repeatedly executed by the electronic control unit 40. When this routine is executed, the electronic control unit 40 determines whether the vehicle 20 is running or parked (S300), sets the running decrease flag F1 to an invalid value when it is determined that the vehicle 20 is parked (S360), and this routine ends.

When it is determined in S300 that the vehicle 20 is running, it is determined whether or not the sunshine condition is satisfied (S310). Here, the sunshine condition includes, for example, a condition in which the current location of the vehicle 20 is daytime and sunny during the predetermined time T1 after switching between driving and parking, or after determining that the previous sunshine condition is satisfied, based on the sunshine information of the current location of the vehicle 20. Sunshine information (weather, times of sunrise and sunset, etc.) from the information center 60 can be used as the sunshine information of the current location of the vehicle 20. As the predetermined time T1, for example, several tens of minutes to about one hour are used. When it is determined in S310 that the sunshine condition is not established, the running decrease flag F1 is held at the previous value, and this routine ends.

When it is determined in S310 that the sunshine condition is established, the power generation amount Ws of the solar cell 31 for the predetermined time T1 is input (S320), and determines whether the input power generation amount Ws of the solar cell 31 for the predetermined time T1 is less than the threshold value Wsth1 (S330). Here, as the power generation amount Ws of the solar cell 31 for the predetermined time T1, a value calculated as an integrated value of the power generation Ps of the solar cell 31 for the predetermined time T1 is input. The threshold Wsth1 is a threshold used to determine whether or not the amount of power generated by the solar cell 31 is decreasing while the vehicle 20 is running. As the threshold value Wsth1, for example, a value of about 50% to 70% of the maximum power generation amount (value based on specifications) of the solar cell 31 in the predetermined time T1 is used.

When it is determined in S330 that the power generation amount Ws of the solar cell 31 for the predetermined time T1 is equal to or greater than the threshold value Wsth1, it is determined that the power generation amount of the solar cell 31 does not decrease while the vehicle 20 is running, and a running decrease flag F1 is set to a value of 0 (S340), and this routine ends. On the other hand, when it is determined in S330 that the power generation amount Ws of the solar cell 31 for the predetermined time T1 is less than the threshold value Wsth1, it is determined that the power generation amount of the solar cell 31 is decreasing while the vehicle 20 is running, a value of 1 is set in the running decrease flag F1 (S350), and this routine ends.

Next, the parking decrease flag setting routine of FIG. 4 will be described. This routine is repeatedly executed by the electronic control unit 40. When this routine is executed, the electronic control unit 40 determines whether the vehicle 20 is running or parked (S400), holds the parking decrease flag F2 at the previous value when it is determined that the vehicle 20 is running, and this routine ends.

When it is determined in S400 that the vehicle 20 is parked, it is determined whether or not the above-described sunshine conditions are met (S410). When it is determined in S410 that the sunshine condition is not established, the parking decrease flag F2 is held at the previous value, and this routine ends.

When it is determined in S410 that the sunshine condition is established, the power generation amount Ws of the solar cell 31 for the predetermined time T1 is input (S420), and determines whether the input power generation amount Ws of the solar cell 31 for the predetermined time T1 is less than the threshold value Wsth2 (S430). Here, the threshold value Wsth2 is a threshold value used to determine whether or not the power generation amount of the solar cell 31 is decreasing while the vehicle 20 is parked. As the threshold value Wsth2, for example, a value of about 50% to 70% of the maximum power generation amount (value based on specifications) of the solar cell 31 in the predetermined time T1 is used. This threshold Wsth2 may be the same value as the threshold Wsth1 described above, or may be a different value.

When it is determined in S430 that the power generation amount Ws of the solar cell 31 for the predetermined time T1 is equal to or greater than the threshold value Wsth2, it is determined that the power generation amount of the solar cell 31 has not decreased while the vehicle 20 is parked, and a value of 0 is set to a parking decrease flag F2 (S440), and this routine ends. On the other hand, when it is determined in S430 that the power generation amount Ws of the solar cell 31 for the predetermined time T1 is less than the threshold value Wsth2, it is determined that the power generation amount of the solar cell 31 is decreasing while the vehicle 20 is parked, and a value of 1 is set to the parking decrease flag F2 (S450), and this routine ends.

Next, the power generation amount decrease cause determination routine of FIG. 2 will be described. This routine is repeatedly executed except when the electronic control unit 40 determines that the decrease in the power generation amount of the solar cell 31 is caused by the state abnormality of the solar cell 31.

When the power generation amount low cause determining routine in FIG. 2 is executed, the electronic control unit 40 determines whether the vehicle 20 is running or parked (S100), and inputs the running decrease flag F1 (S110) and determines whether the input running decrease flag F1 has a value of 1 (S120), when the electronic control unit 40 determines that the vehicle 20 is running. When it is determined that the running decrease flag F1 is not 1, that is, is 0 or an invalid value, it is determined that the power generation amount of the solar cell 31 has not decreased (S230), and this routine ends.

When it is determined in S120 that the running decrease flag F1 is the value 1, it is determined that a decrease in the amount of power generated by the solar cell 31 has occurred (S130), and the decrease in the amount of power generated by the solar cell 31 indicates an abnormality in the state of the solar cell 31 (for example, contamination of the solar cell 31, etc.) is determined (S200), the warning light 42 is turned on (S210), and the routine ends. When the sunshine condition is satisfied and the amount of power generated by the solar cell 31 is decreasing, and the vehicle 20 is running (when the position of the solar cell 31 is moving), the solar cell 31 Since it is difficult to think that the decrease in the power generation amount of is caused by the external environment (for example, the solar cell 31 is in the shade), it is determined that it is caused by the state abnormality of the solar cell 31. In addition, by turning on the warning light 42, the user can be notified of the abnormal state of the solar cell 31.

When it is determined in S100 that the vehicle 20 is parked, the parking decrease flag F2 is input (S140), and it is determined whether the input parking decrease flag F2 is 1 or 0 (S150). When it is determined that the parking decrease flag F2 is 0, it is determined that the amount of power generated by the solar cell 31 has not decreased (S230), and the routine ends.

When it is determined in S150 that the parking decrease flag F2 is the value 1, it is determined that the power generation amount of the solar cell 31 is decreasing (S160), and the running decrease flag F1 is input (S170), and it is determined whether the running decrease flag F1 is a valid value (value 0 or value 1) or an invalid value (S180). Then, when it is determined that the running decrease flag F1 is an invalid value, the process returns to S140. While the vehicle 20 is parked, or until the sunshine condition is satisfied for the first time after the vehicle 20 is parked and starts running (until the value 1 or 0 is set to the running decrease flag F1), an invalid value is set to the running decrease flag F1. Therefore, if the position of the solar cell 31 changes from the shade to the sun while the vehicle 20 is parked, the parking decrease flag F2 may change from 1 to 0.

When it is determined in S180 that the running decrease flag F1 has a valid value, it is determined whether the running decrease flag F1 is 1 or 0 (S190). When it is determined that the running decrease flag F1 is 1, it is determined that the decrease in the power generation amount of the solar cell 31 is caused by the state abnormality of the solar cell 31 (S200), the warning light 42 is turned on (S210), and exit the routine. The reason why it is determined that the decrease in the power generation amount of the solar cell 31 is caused by the state abnormality of the solar cell 31 when the running decrease flag F1 is the value 1 has been described above.

When it is determined in S190 that the running decrease flag F1 is 0, it is determined that the decrease in the power generation amount of the solar cell 31 is caused by the external environment (S220), and this routine ends. The time when the parking decrease flag F2 is the value of 1 and the running decrease flag F1 is 0, that is, the time when it is determined that the decrease in the power generation amount of the solar cell 31 occurs while the vehicle 20 is parked, and the time when it is determined that the amount of power generated by the solar cell 31 does not occur while the vehicle 20 travels, is considered. When the vehicle 20 is parked (the position of the solar cell 31 is stopped) and the sunshine condition is satisfied, the amount of power generated by the solar cell 31 is decreasing, and the vehicle 20 is not running (the position of the solar cell 31 has moved) and the solar cell 31 does not have a decrease in the power generation amount of the solar cell 31 (is resolved) when the sunshine condition is met is considered to be caused by the external environment (for example, the solar cell 31 is shaded while the vehicle 20 is parked).

In this way, the running decrease flag F1 (indicating whether or not the power generation amount of the solar cell 31 is decreasing while the vehicle 20 is running) and the parking decrease flag F2 (indicating whether or not a decrease in the amount of power generation of the solar cell 31 has occurred while the vehicle 20 is parked) are used, so that it is possible to determine the cause when a decrease in the amount of power generation of the solar cell 31 occurs.

In the electronic control unit 40 as the vehicle management device of the present embodiment described above, the running decrease flag F1 (indicating whether or not the power generation amount of the solar cell 31 is decreasing while the vehicle 20 is running) and the parking decrease flag F2 (indicating whether or not the amount of power generated by the solar cell 31 has decreased while the vehicle 20 is parked), are used, and the amount of power generated by the solar cell 31 is determined when a decrease in the amount of power generated by the solar cell 31 occurs, and it is determined whether the decrease is caused by the abnormal state of the solar cell 31 or by the external environment. Thereby, the cause of the decrease in the amount of power generated by the solar cell 31 can be determined.

In the embodiment described above, in the running decrease flag setting routine of FIG. 3, the electronic control unit 40 sets the running decrease flag F1 to an invalid value when it is determined that the vehicle 20 is parked. However, instead of this, when it is determined that the vehicle 20 is parked, the running decrease flag F1 is held at the value set during driving until a predetermined time T3 elapses from the end of driving (start of parking). Alternatively, when a predetermined time T3 has passed since the end of running, the running decrease flag F1 may be switched to an invalid value. In this case, when it is determined in S150 that the parking decrease flag F2 has the value of 1 and the decrease in the amount of power generated by the solar cell 31 has occurred in S160 in the routine for determining the cause of the decrease in the amount of power generation shown in FIG. 2, there is a case where the running decrease flag F1 is a valid value and the process proceeds to S190 immediately.

Figure 5:
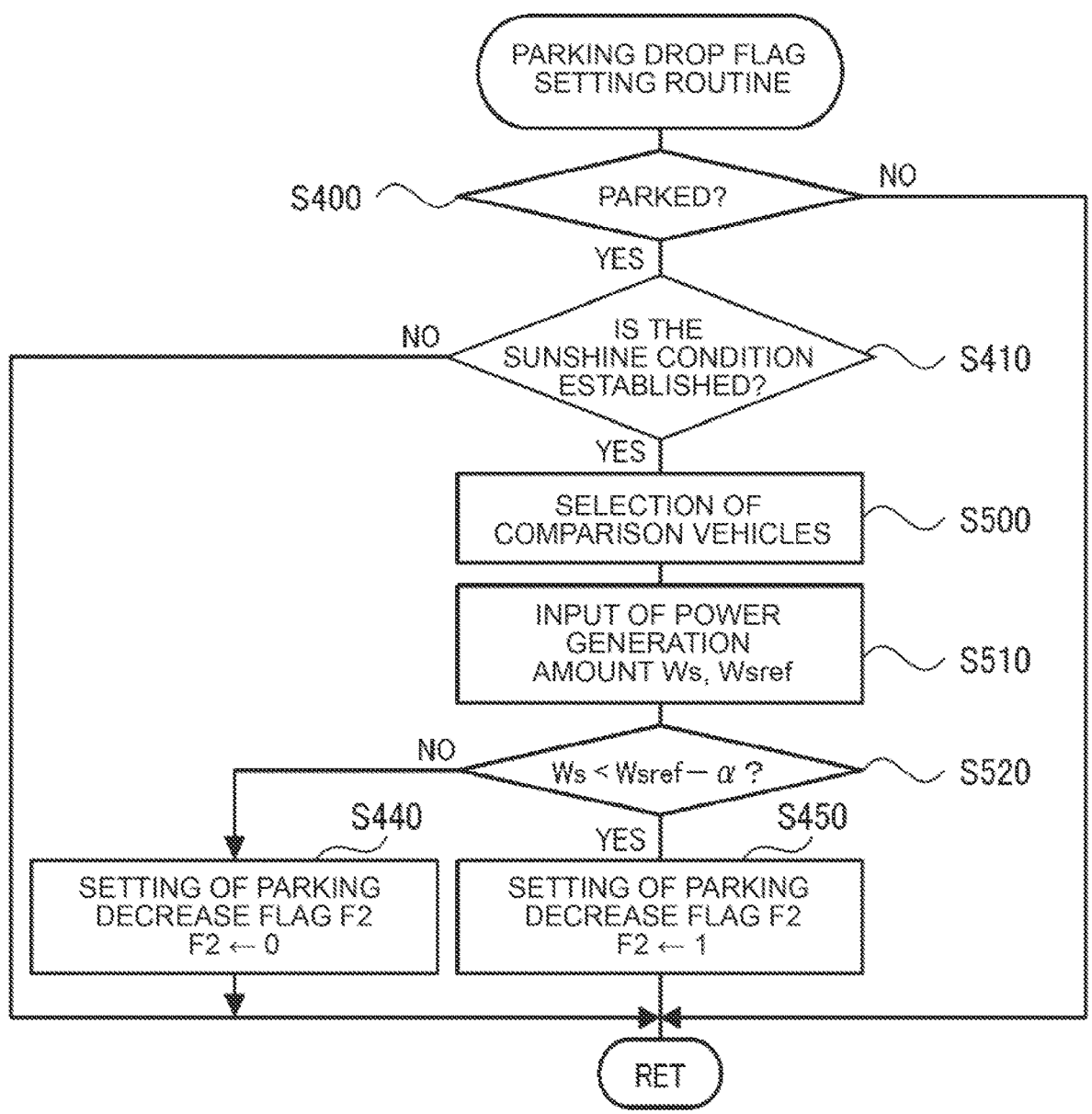
FIG. 5 is a flowchart showing an example of a parking drop flag setting routine.

In the embodiment described above, the electronic control unit 40 sets the parking decrease flag F2 by the parking decrease flag setting routine of FIG. 4. However, instead of this, the electronic control unit 40 may set the parking decrease flag F2 by the parking decrease flag setting routine of FIG. 5. The parking low flag setting routine of FIG. 5 is the same as the parking low flag setting routine of FIG. 4 except that the processes of S420 and S430 are replaced with the processes of S500 to S520. Therefore, in the parking low flag setting routine of FIG. 5, as for the same processes as those of the parking low flag setting routine of FIG. 4, the same symbols are applied, and a detailed description is omitted. In this case, the electronic control unit 40 can communicate with other vehicles.

Figure 6:
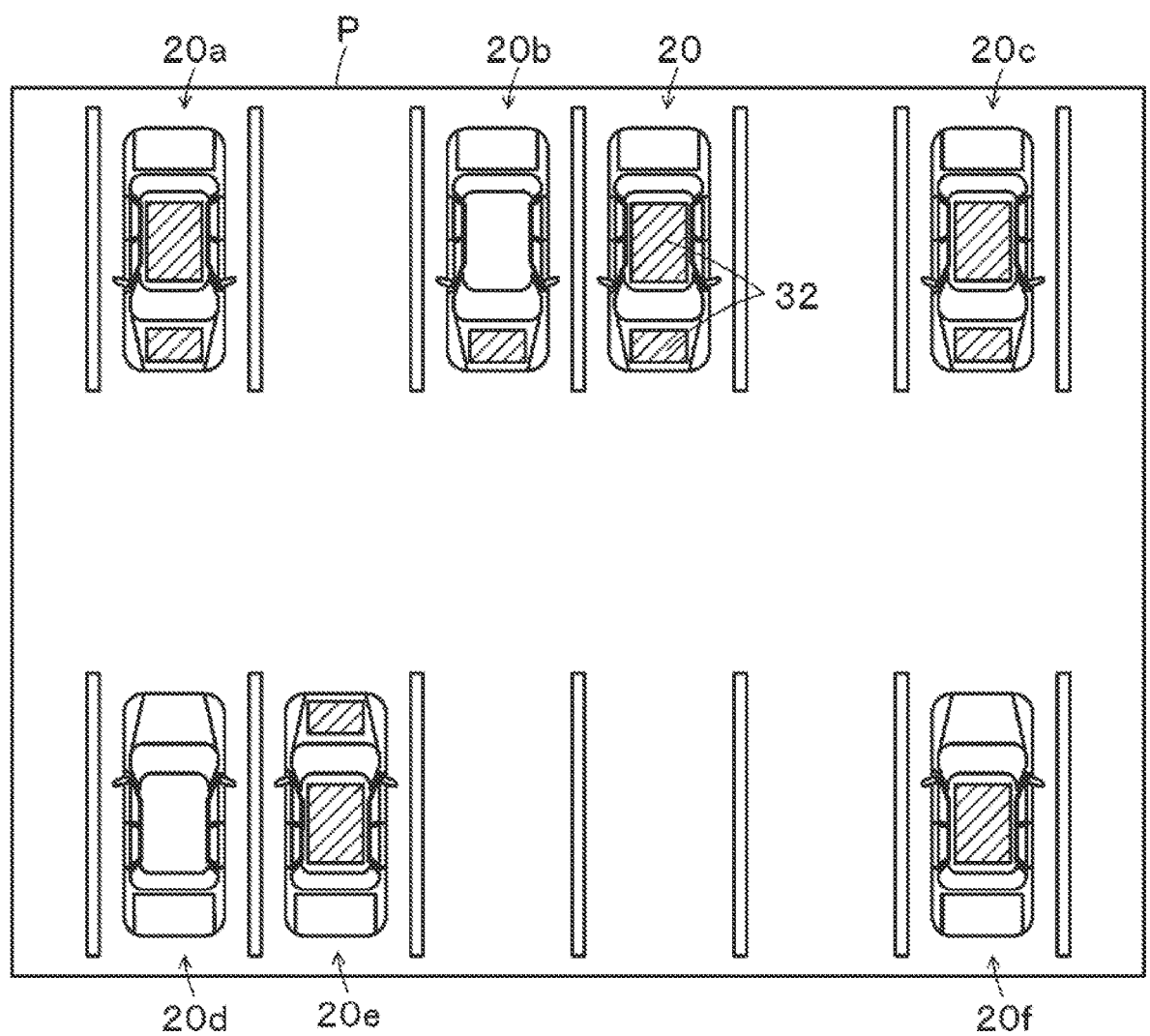
FIG. 6 is an explanatory diagram showing an example of how comparison vehicles are selected.

In the parking low flag setting routine of FIG. 5, when the electronic control unit 40 determines in S410 that the sunshine condition is established, it communicates with other vehicles and selects a comparison vehicle based on the result (S500). In the process of S500, for example, another vehicle having the maximum power generation of the solar cell 31 and the maximum power generation amount for the predetermined time T1 (both values based on the specifications) are the same as the own vehicle 20, and the closest position to the own vehicle 20 is the other vehicle is selected as a comparison vehicle. FIG. 6 is an explanatory diagram showing an example of how comparison vehicles are selected. In the drawing, the hatched portion indicates the solar cell 31 for each vehicle (own vehicle 20 and other vehicles 20a to 20f) parked in the parking lot P. A description will be given assuming that the area of the hatched portion and the maximum power generation of the solar cell 31 and the maximum power generation amount for the predetermined time T1 are correlated. First, the own vehicle 20, among the other vehicles 20a to 20f parked in the parking lot P, the other vehicles 20a, 20c, and 20e whose maximum power generation of the solar cell 31 and the maximum power generation amount for the predetermined time T1 are similar to that of the own vehicle 20 are selected as candidates for comparison vehicles. Subsequently, the other vehicle 20c parked at the closest position from the own vehicle 20 is selected as a comparison vehicle from among the other vehicles 20a, 20c, and 20e.

When the comparison vehicle is selected in this way, the power generation amounts Ws and Wsref of the solar cells 31 of the own vehicle 20 and the comparison vehicle for the predetermined time T1 are input (S510), and the power generation amount Ws of the solar cells 31 of the own vehicle 20 during the predetermined time T1 is input, or whether the value (Wsref−α) obtained by subtracting the margin α from the power generation amount Wsref of the solar cell 31 of the comparison vehicle for the predetermined time T1 (S520). Similar to the process of S430, the process of S520 is a process of determining whether or not the power generation amount of the solar cell 31 is decreasing while the vehicle is parked. When it is determined in S520 that the power generation amount Ws of the solar cell 31 of the vehicle 20 for the predetermined time T1 is equal to or greater than the value (Wsref−α), the power generation amount of the solar cell 31 is decreasing while the vehicle 20 is parked, it is determined that there is no such condition, the value 0 is set to the parking decrease flag F2 (S440), and this routine is terminated. On the other hand, when it is determined in S520 that the power generation amount Ws of the solar cell 31 of the vehicle 20 for the predetermined time T1 is less than the value (Wsref−α), the power generation amount of the solar cell 31 decreases while the vehicle 20 is parked, it is determined that the vehicle is being parked, and the value 1 is set to the parking decrease flag F2 (S450), and this routine ends. Also in this way, it is possible to determine whether or not the power generation amount of the solar cell 31 is decreasing while the own vehicle 20 is parked.

In the parking low flag setting routine of FIG. 5, another vehicle parked at the position closest to the own vehicle 20 from among the other vehicles with the same degree of the maximum power generation amount of the solar cell 31 and the maximum power generation amount during the predetermined time T1 as the own vehicle 20 is selected as a comparison vehicle. However, it is not limited to this, as long as the other vehicle has a maximum power generated by the solar cell 31 or a maximum power generation amount for the predetermined time T1 that is similar to that of the own vehicle 20. In place of the comparison vehicle, if the maximum power generated by the solar cell 31 or the maximum power generation amount for the predetermined time T1 is about the same as that of the own vehicle 20, the vehicle may not be a vehicle, and it may be a solar cell or the like.

In the embodiment described above, the electronic control unit 40 turns on the warning light 42 when determining that the decrease in the power generation amount of the solar cell 31 is caused by the state abnormality of the solar cell 31. However, at this time, the electronic control unit 40 displays on the display of the navigation device 38 or outputs voice from the speaker of the vehicle 20 that the decrease in the power generation amount of the solar cell 31 is caused by the state abnormality of the solar cell 31, may be displayed on a display of a preset mobile terminal (for example, a smartphone or a tablet terminal), or may be sent to a preset e-mail address.

In the embodiment described above, the battery 26 is used as the power storage device, but instead of this, a capacitor or the like may be used.

In the embodiment described above, the form of the vehicle 20 is provided with the driving unit 22 having the motor 23, the battery 26 and the solar cell system 30. However, any device that includes the driving unit 22, the battery 26 and the solar cell system 30 may be used. For example, driving unit 22 may be in the form of a hybrid electric vehicle having an engine in addition to motor 23.

The correspondence relationship between the main elements of the embodiments and the main elements of the disclosure described in the column of Means for Solving the Problems will be described. In the embodiment, the driving unit 22 corresponds to the "driving unit", the battery 26 corresponds to the "power storage device", the solar cell system 30 corresponds to the "solar cell system", and the vehicle 20 corresponds to the "vehicle", the electronic control unit 40 corresponds to the "vehicle management device".

Note that the correspondence relationship between the main elements of the embodiment and the main elements of the disclosure described in the column of Means for Solving the Problem indicates that the embodiment implements the disclosure described in the column of Means to Solve the Problem. Since it is an example for specifically explaining the mode for solving the problem, it does not limit the elements of the disclosure described in the column of the means for solving the problem. That is, the interpretation of the disclosure described in the column of Means to Solve the Problem should be made based on the description in that column, and the embodiment should be based on the description of the disclosure described in the column of Means to Solve the Problem. This is only a specific example.

Although the embodiments for carrying out the present disclosure have been described above, the present disclosure is not limited to such embodiments in any way, and can be implemented in various forms without departing from the gist of the present disclosure.

The present disclosure is applicable to the manufacturing industry of vehicle management devices and the like.

What is claimed is:

1. A vehicle management device, wherein:
   the vehicle management device is used in a vehicle that includes a driving unit for traveling, a power storage device that is able to supply power to the driving unit, and a solar cell system that is able to supply power generated by a solar cell to the power storage device, and determines cause of a decrease in a power generation amount of the solar cell; and
   the vehicle management device determines whether the decrease in the power generation amount is caused by an abnormality in a state of the solar cell or is caused by an external environment, based on whether the decrease in the power generation amount occurs while the vehicle travels and whether the decrease in the power generation amount occurs while the vehicle is parked.

2. The vehicle management device according to claim 1, wherein:
   the vehicle management device determines that the decrease in the power generation amount is caused by the abnormality in the state, when determination is made that the decrease in the power generation amount occurs while the vehicle travels; and
   the vehicle management device determines that the decrease in the power generation amount is caused by the external environment, when determination is made that the decrease in the power generation amount occurs while the vehicle is parked and that the decrease in the power generation amount does not occur while the vehicle travels.

3. The vehicle management device according to claim 1, wherein:
   the vehicle management device determines, while the vehicle travels, whether the decrease in the power generation amount occurs by comparing a power generation amount during traveling, the power generation amount being a power generation amount of the solar cell while the vehicle travels, with a first predetermined power generation amount; and
   the vehicle management device determines, while the vehicle is parked, whether the decrease in the power generation amount occurs by comparing a power generation amount during parking, the power generation amount being a power generation amount of the solar cell while the vehicle is parked, with a second predetermined power generation amount, or comparing the power generation amount during parking with a power generation amount of the solar cell around the vehicle.

4. The vehicle management device according to claim 3, wherein:
   the vehicle management device determines, while the vehicle travels, whether the decrease in the power generation amount occurs using the power generation amount during traveling when a sunshine condition is satisfied; and
   the vehicle management device determines, while the vehicle is parked, whether the decrease in the power generation amount occurs using the power generation amount during parking when the sunshine condition is satisfied.

5. The vehicle management device according to claim 1, wherein the vehicle management device notifies predetermined information when determination is made that the decrease in the power generation amount is caused by the abnormality in the state.

* * * * *